United States Patent [19]

Harben, III et al.

[11] Patent Number: 4,876,767
[45] Date of Patent: Oct. 31, 1989

[54] VENT CLEANING APPARATUS AND METHOD FOR POULTRY

[76] Inventors: Grover S. Harben, III, 3319 Edgewater Terr., Gainesville, Ga. 30501; Leonard G. Clark, Route 2, Dawsonville, Ga. 30534

[21] Appl. No.: 213,247
[22] Filed: Jun. 29, 1988
[51] Int. Cl.⁴ .......................................... A22C 21/00
[52] U.S. Cl. ...................................................... 17/11
[58] Field of Search ............................................ 17/11

[56] References Cited

U.S. PATENT DOCUMENTS

| | | | |
|---|---|---|---|
| 2,997,736 | 8/1961 | Ine | 17/11 |
| 3,137,031 | 6/1964 | Ine | 17/11 |
| 3,786,535 | 1/1974 | LaBarber . | |
| 4,024,603 | 5/1977 | Harben, Jr. et al. | 17/11 |
| 4,557,016 | 12/1985 | Markert | 17/11 |
| 4,564,977 | 1/1986 | Scheler . | |
| 4,677,709 | 7/1987 | Dixon | 17/11 |
| 4,739,539 | 4/1988 | Simmons . | |

*Primary Examiner*—Willis Little
*Attorney, Agent, or Firm*—Jones, Askew & Lunsford

[57] ABSTRACT

Suction apparatus and process for removing fecal matter from the vents of bird carcasses such as chickens and turkeys. A hollow suction probe enters the vent of the bird, and a flow of water is introduced in the vicinity of the probe opening to provide a mass flow sufficient to transport loose fecal matter into the suction opening of the probe. Suction and water flows at the probe are controlled so that the beginning and end of the water flow is overlapped by suction, thereby preventing the unwanted entry of water into the bird beyond the end of the probe.

8 Claims, 3 Drawing Sheets

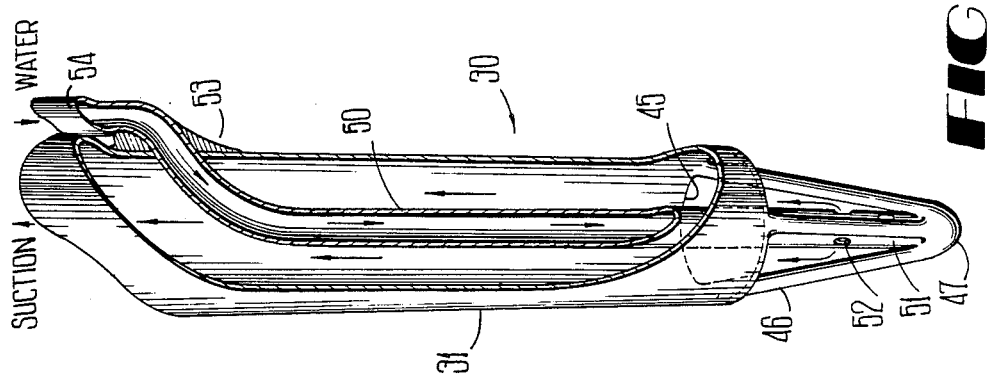
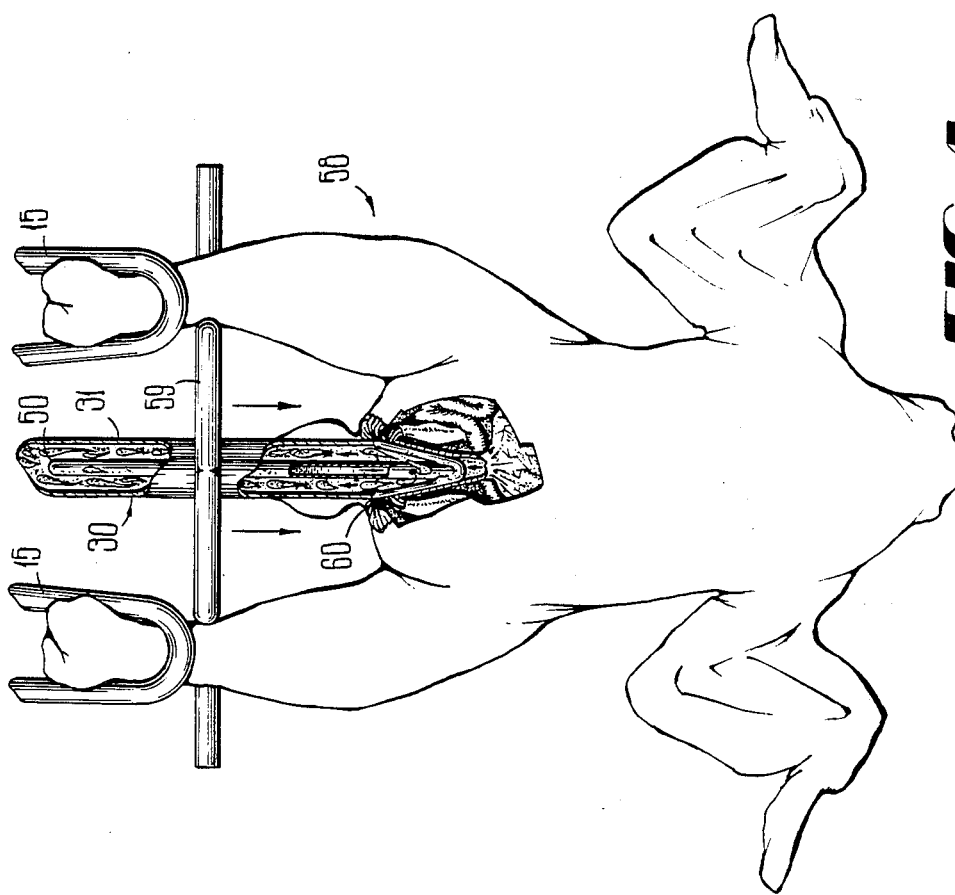

VENT CLEANING APPARATUS AND METHOD FOR POULTRY

FIELD OF INVENTION

This invention relates in general to processing the carcasses of freshly-killed fowl such as chickens and turkeys, and relates in particular to removing fecal matter from the vent of such fowl.

BACKGROUND OF THE INVENTION

Commercial processing of freshly-killed fowl requires a number of steps beginning with defeathering the carcass of the bird and typically ending with the cleaned carcass being cut into parts suitable for cooking, or with the whole carcass being preserved for cooking. Included in the steps of commercially processing such birds are removal of the viscera and other parts to prevent spoilage and infection of the carcass. These processing steps in commercial poultry-processing operations are subject to governmental regulation and on-site inspection for health and sanitary purposes.

Removal of fecal matter from the intestines of freshly-killed birds is necessary at an early stage in processing the bird carcasses. Fecal matter remaining in the vent or intestine when the vent or viscera are removed is likely to become dislodged and fall onto or within the carcass, creating a possible health hazard and leading to rejection of that carcass by the health inspectors.

One prior approach to removing fecal matter involves squeezing or kneading the large intestine and cloaca of the birds to force fecal matter from the bird. This is usually done manually, and cannot effectively be accomplished at a rate consistent with the desired operation of bird conveyors in modern poultry processing facilities. Another approach to the problem involves the use of a suction probe inserted into the vent of the bird. Loose fecal matter within the vent is supposedly withdrawn by suction applied to the probe. Suction vent cleaners of the prior art have not been particularly satisfactory, however. Such probes often cannot remove all the loose fecal matter, due to the absence of air within the vent to create an air flow for entraining fecal matter into the suction probe which itself occupies the vent at the time. Efforts to overcome this problem by increasing the amount of suction can actually suck out part of the intestine itself, damaging the bird and preventing clean cutting and removal of the vent as a normal subsequent operation in processing.

It has been proposed to inject a flow of water into the vent of a bird before applying suction to remove water and fecal matter. This proposed arrangement is shown in U.S. Pat. No. 3,137,031 to Ine. No commercial application of this proposal is known to the present inventors, and it is believed the nonacceptance of that proposal results from concerns that injecting water or other liquid into the vent might rupture the intestine of the bird, thereby spoiling the carcass with fecal mattter spilled from the ruptured intestine.

SUMMARY OF THE INVENTION

Stated in general terms, the present invention augments the suction removal of fecal matter by flowing water or another liquid medium within the vent cleaning probe, only to the extent necessary for providing mass flow which moves the fecal matter from the vent in response to suction within the probe. The liquid flow is not introduced into the vent beyond the end of the suction probe, and thus water is not injected into the bird. This process and the apparatus for practicing the process significantly improves the removal of fecal matter from the birds.

Stated somewhat more specifically, the present vent cleaner includes a suction probe configured for insertion into the vent of the bird. The suction probe includes a conduit discharging water at a location near the end of the probe, preferably somewhat inwardly from the probe end, and at a location where the water discharged is immediately withdrawn from the vent by the suction probe. The water is preferably introduced at a substantial angle to the longitudinal path of the probe and the vent, so that the applied water is not directed beyond the probe into the vent.

To prevent injection of water from the suction probe into the vent or intestine of the bird, suction is applied to the probe before water is applied to the water inlet tube. After a flow of suction is established within the probe, the water flow is then initiated and the probe receives both water and suction for a time. The water and suction are then turned off in order reversed from the initiation of these flows, with the water first being turned off while the suction remains applied for a short duration to remove any water and fecal matter remaining within the vent. The probe is then withdrawn from the vent, leaving the bird prepared for further processing steps.

Accordingly, it is an object of the present invention to provide an improved apparatus and method for cleaning the vent of a bird.

It is another object of the present invention to provide a vent cleaning apparatus and method utilizing liquid to help remove fecal matter.

It is yet another object of the present invention to provide a vent cleaning method and apparatus using a liquid flow to augment the suction removal of fecal matter without injecting liquid into the bird.

Other objects and advantages of the present invention will become more readily apparent from the following description of a preferred embodiment.

BRIEF DESCRIPTION OF THE DRAWING

FIG. 3 is an enlarged pictorial view, partially cut away for illustrative purposes, showing one of the suction probes used in the apparatus of FIG. 1.

FIG. 4 is a partially-sectioned elevation view showing the vent cleaning probe of FIG. 2 in use.

DESCRIPTION OF PREFERRED EMBODIMENT

Figure 1:
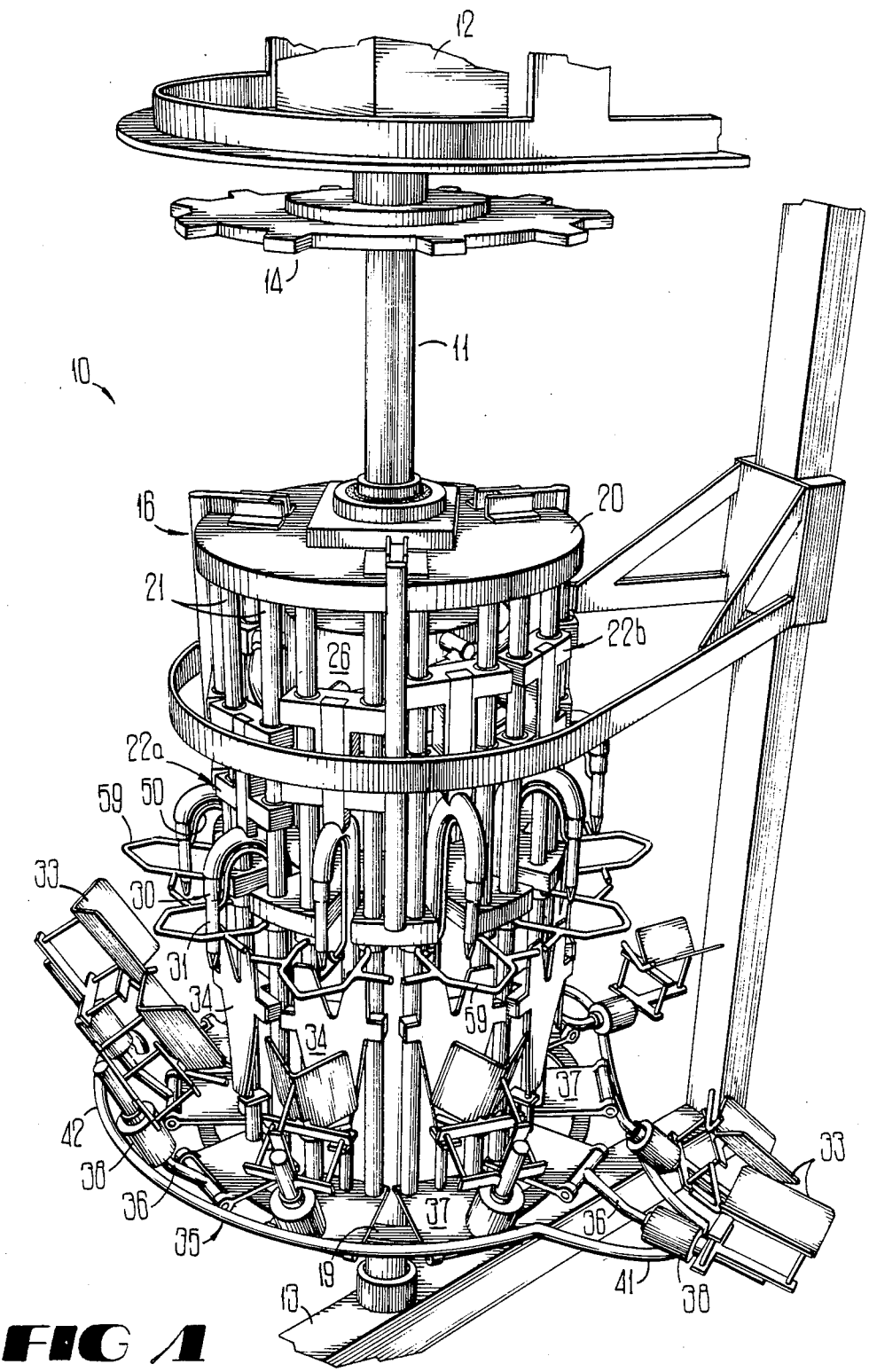
FIG. 1 is a pictorial view showing vent cleaning apparatus according to a preferred embodiment of the present invention.

Turning first to FIG. 1, there is shown generally at 10 a vent cleaning apparatus according to the present invention. The apparatus 10 includes an upright shaft 11 rotatably mounted between the upper structural support 12 and the lower base 13. A sprocket 14 attaches to the upper end of the shaft 11, and those skilled in the art will understand that the sprocket engages and is driven by the overhead conveyor chain (not shown) which circulates through the typical poultry processing facility. These conveyor chains carry depending shackles which engage and transport the carcasses of freshly-killed birds such as chickens or turkeys. A fragmentary portion of one such shackle is shown at 15 in FIG. 4.

The rotating portion of the apparatus 10, hereinafter referred as the carousel 16, has a base 19 and a top 20 longitudinally spaced apart from each other along the shaft 11. Extending between the base 19 and the top 20 are plural pairs of vertical slide bars 21, with a support plate 22 being disposed for slidable movement on each pair of slide bars. It will be understood that the apparatus 10 has a pair of slide bars 21 and an associated support plate 22 corresponding to each bird-carrying shackle on the chain conveyor that engages the sprocket 14, so that the slide bars and support plates located around the carousel 16 form parts of a plurality of vent cleaning stations for receiving each bird arriving at the apparatus by way of the overhead conveyor.

Figure 2:
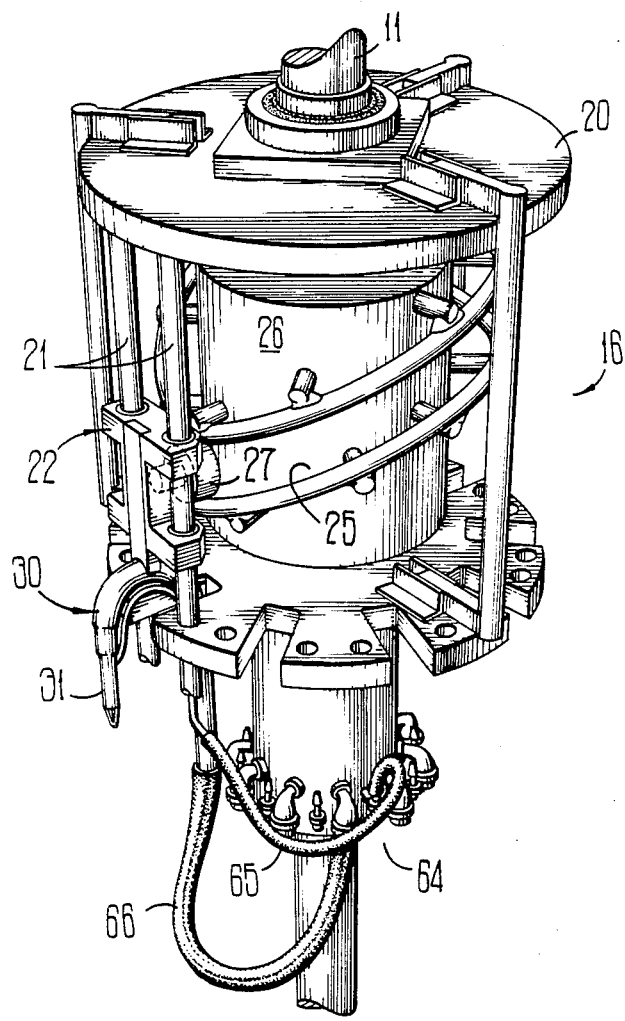
FIG. 2 is a pictorial view as in FIG. 1 but showing only the rotary carousel portion and one suction probe mounted thereon.

The vertical position of each support plate 22 is controlled by a cam track 25, FIG. 2, formed by a pair of spaced-apart rods mounted on the stationary interior hub 26 located radially inwardly from the slide bars 21. A cam follower 27 on the back of each support plate 22 engages the cam track 25 and controls the vertical position of the support plate as the carousel assembly rotates relative to the interior hub 26. For example, the support plate 22A in FIG. 1 is at a substantially lowermost position on the corresponding slide bars 21, while the support plate 22B is raised by the cam track and associated cam follower to a substantially uppermost position.

A vent probe 30 somewhat in the shape of an inverted-J is carried by each support plate 22, for vertical movement with the respective support plates. Each vent probe 30 includes a downwardly-directed tube 31 generally parallel with the slide bars 21 and projecting radially a distance outwardly from the slide bars. Further details of the vent probes 30 are set forth below.

Referring again to FIG. 1, carried on the base 19 for rotation therewith are a number of V-shaped plates 33 which are selectively moved into and out of confronting juxtaposition with the relatively flat and substantially vertical support plates 34 mounted beneath and somewhat radially inwardly of each vent probe 30. The support plates 34 are fixed in vertical position, and simply rotate with the carousel apparatus 16 as the shaft 11 turns. The V-shaped plates 33, however, are raised and lowered as the carousel rotates. This movement of the V-shaped plates 33 is accomplished by the stationary cam rail 35 mounted near the bottom of the apparatus 10.

Each V-shaped plate 33 is mounted at one end of a support rod 36 whose other end is pivotably attached to a support 37 affixed to the base 19 of the apparatus. A roller 38 is carried on each support rod 36 between the V-shaped plate 33 and the support 37, and these rollers travel along the stationary cam rail 35 as the carousel rotates. The cam rail 35 is stationary and surrounds the rotating carousel 16. A lower portion 41 of the cam rail allows the rollers 38 and corresponding V-shaped plates 33 to descend by gravity to a position retracted from the corresponding support plates 34 as the carousel rotates, allowing birds moving along the conveyor line to enter and leave the vent cleaning apparatus 10. The lower portion 41 of the cam rail 35 connects by ramp portions to the raised portion 42 of the cam rail, this raised portion forcing the rollers 38 upwardly and moving the V-shaped plates 33 into confronting spaced-apart relation with the corresponding support plates 34 to position and hold a bird between those two plates.

Details of the vent probe 30 are seen in FIG. 3. The tube 31 of the vent probe 30 is hollow and terminates at the open lower end 45. A plurality of rounded guide rods 46 are secured to the lower end 45 and extend a short distance beyond the lower end, converging to a smooth rounded tip 47. The tip 47 constitutes the outermost part of the vent probe 30, and is sized and configured to accommodate entry of the vent probe into the vent of a bird as described below.

A hollow water-supply tube 50 extends coaxially within the tube 31 of the vent probe 30, and dead-ends at 51 behind the tip 47 formed by the convergence of the guide rods 46. A terminal portion of the water supply tube 50 is thus exposed beyond the open lower end 45 of the outer tube 31. One or more water outlet openings 52 are formed in the side of the exposed end of the water supply tube 50, and the axis of each opening 52 preferably is substantially lateral to the longitudinal axis of the vent probe 30.

The water supply tube 50 extends coaxially a distance inside the outer tube 31, upwardly to a point shown at 53 where the water supply tube emerges through the outer tube and thereafter lies closely along the outer surface of the tube 31 as illustrated at 54 in FIG. 2. The water supply tube 50 of each vent probe 30 is selectively connected to a source of water for a predetermined portion of each rotation of the carousel 16, as explained below in greater detail. The outer tube 31 likewise is selectively connected to a source of suction during a predetermined portion of each rotation.

Figure 5:
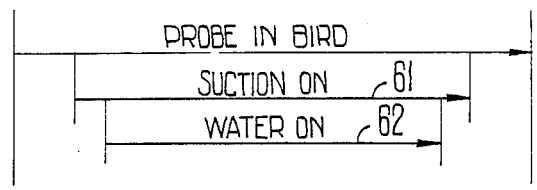
FIG. 5 is a timing diagram illustrating the operation of the disclosed apparatus.

The operation of the disclosed embodiment is now discussed with particular reference to FIGS. 3, 4, and 5. This discussion assumes the vent cleaning apparatus 10 is located in a typical processing conveyor line with the conveyor chain passing over the sprocket 14 of the vent cleaning apparatus, as previously described. Birds such as the one 58 shown in FIG. 4 are suspended by their legs from shackles 15 depending from the conveyor chain (not shown). Because the vent cleaning apparatus 10 operates synchronously with the conveyor chain, each arriving bird 58 is juxtaposed with one of the support plates 34 mounted on the rotating carousel. The V-shaped plate 33 corresponding to the particular support plate 34 is in the lowermost position when the bird arrives, because the lower portion 41 of the cam rail 35 includes the arrival as well as departure locations on the circumference of the carousel. A separator bar 59, FIGS. 1 and 4, projects outwardly from each vent cleaning station at a fixed elevation, in position to fit between the spaced-apart legs of the bird as carried by the shackles 15. This separator bar maintains the proper spacing between the legs of the bird, and otherwise helps locate and support the bird with respect to the vent cleaning station.

After each arriving bird is properly positioned at a work station, continuing rotation of the carousel 16 brings the roller 38 associated with the V-shaped plate 33 of that vent cleaning station to the upramped portion of the cam rail 35 leading to the raised portion 42 of the cam rail. This upward movement of the roller 38 pivots upwardly the V-shaped plate 33 until that plate contacts the breast of the bird. At this time the bird is snugly held between the V-shaped plate 33 and the support plate 34 spaced radially inwardly from the V-shaped plate. The bird remains thus held between the two plates 33 and 34 of the vent cleaning station as rotation of the carousel 16 continues, until the roller 38 again leaves the raised portion 42 of the cam rail 35 at the end of the vent cleaning process.

When the carousel has rotated to the point where the V-shaped plate 33 firmly holds the bird against the support plate 34, the cam follower 27 of the support plate 22 for the corresponding vent cleaning station enters a downwardly-sloping portion of the cam track 25. The cam follower 27 thus lowers the support plate 22 and the attached vent probe 30, in relation to the bird 58 held in place at that vent cleaning station. The bird 58 is positioned with its vent opening 60 facing upwardly, substantially in line with the now-descending vent probe 30. The rounded tip 47 and the guide rods 46 guide the probe in entering the vent opening 60 as shown in FIG. 4, to a depth determined by the contour of the cam track 25. This depth must be at least sufficient to place the open lower end 45 of the outer tube 31 within the vent opening 60 of the bird.

With the vent probe 30 fully inserted within the bird, suction is applied to the outer tube 31 of the vent probe. A short while after probe suction is first applied, water flow commences through the water supply tube 50 leading to the lateral water outlet openings 52 below the open lower end 45 of the vent probe. The water flow remains on for a predetermined period of time, after which the water flow to the tube 50 is turned off. However, suction remains applied to the outer tube 31 of the vent probe for a short time following termination of the water flow, as the carousel continues to rotates. Further rotation of the carousel brings the cam follower 27 of each vent cleaning station to a point where the cam track 25 elevates the support plate 22, withdrawing the vent probe 30 from the bird 58. The rollers 38 now enter the lower portion 41 of the cam rail 35, withdrawing the V-shaped plate 33 from the bird 58 and freeing the bird from the vent cleaning apparatus 10. The bird thus leaves the vent cleaning apparatus as the overhead conveyor chain moves the bird toward the next stage of the processing operation.

It is an important aspect of the present invention that water be applied to the vent probe 30 only while the probe receives suction. This relationship is shown in FIG. 5, where the "suction on" period 61 overlaps the "water on" period 62. This overlap of suction assures that water flowing from the one or more outlet openings 52 in the water supply tube 50 does not flow into the bird beyond the vent probe 30. The lateral outflow direction of water from the openings 52 also helps prevent further water flow into the bird, as this lateral flow of water is substantially transverse to the longitudinal axis of the water supply tube 50 and to the alignment of the vent itself. Water exiting the outlet openings 52 is thus immediately drawn upwardly into the open lower end 45 of the vent probe, by the suction already present within the outer tube 31 at the time the water flow commences. This upward flow of water from the outlet openings 52 provides a mass flow which significantly assists in conducting loose fecal matter from the vent into the lower end 45 of the outer tube 30, and thus out of the bird.

The selective timed application of suction and water to each vent probe 30 in turn is controlled by a rotary valve assembly 64 located within the base of the vent cleaning apparatus 10, and connected respectively to suction and water supply sources. The water supply tube 50 and outer tube 31 of each probe 30 are connected to the valve assembly 64 by separate flexible lines 65 and 66, respectively. The design and construction of such rotary valves is well within the skill of the art. Suction pressure in the order of about 16–18 inches of water and water at standard line pressure in the order of 60–80 p.s.i. are suitable, although not considered limiting factors.

It should be understood that the foregoing refers only to a preferred embodiment of the present invention, and that numerous modifications and alterations therein may be made without departing from the spirit and scope of the invention as defined in the following claims.

What is claimed is:

1. The method of cleaning the vent of a fowl, comprising the steps of:
   inserting a hollow probe into the vent;
   applying a suction to the probe for a predetermined first period of time, so that loose fecal matter in the vent tends to move from the vent into the probe;
   applying a flow of liquid exiting the probe at a substantial angle to the longitudinal axis of the probe within the vent, so that the applied liquid flow is not directed further into the vent; and
   applying said liquid flow for a predetermined second period of time less than the first period and overlapped by the first period, so that the suction is applied to the probe before the liquid flow commences and remains applied for a time after the liquid flow ends, thereby preventing flow of the liquid beyond the probe into the vent,
   whereby the liquid entrains fecal matter and is withdrawn through the probe by the suction without being injected into the fowl.

2. The method of claim 1, wherein the liquid flow is applied within the vent at substantially a right angle to the longitudinal axis of the probe.

3. The method of cleaning fecal matter from the vent of a fowl, comprising the steps of:
   applying a reduced atmospheric pressure to the vent for a first period of time, thereby tending to remove loose fecal matter from the vent; and then
   applying a flow of liquid to the vent in a direction substantially lateral to the longitudinal axis of the vent, so that the liquid is not directed to flow longitudinally beyond the point of application within the vent; and
   applying the flow of liquid to the vent for a second period of time less than the first period and overlapped by the first period, so that the vent is subjected to the reduced pressure before, during, and after the liquid flow, so as to prevent the liquid from further entering the vent,
   whereby the liquid entrains fecal matter in the vent as the reduced pressure withdraws the liquid from the vent.

4. The method of claim 3, wherein the liquid is applied within the vent at a greater depth than the application of reduced pressure therein, so that the liquid and entrained fecal matter are withdrawn by the reduced pressure without further entering the vent.

5. Apparatus for cleaning the vent of a fowl, comprising: an elongated hollow probe having a forward end operative for insertion into the vent;
   means selectively operative to apply a suction to the probe so as to draw fecal matter into the probe from within the vent;
   means at the forward end of the probe for applying a flow of liquid directed substantially laterally outwardly from the probe so that the liquid is not injected into the fowl beyond the forward end of the probe; and means operative to apply the flow of liquid only after suction is applied to the probe, and to maintain the suction for a predetermined time after the flow of liquid terminates, so that the liquid from the probe cannot flow further into the fowl beyond the forward end of the probe, whereby the liquid entrains fecal matter and the suction withdraws the liquid and entrained fecal matter throught the probe, without causing a flow of liquid within the vent beyond the forward end of the probe.

6. Apparatus as in claim 5, further comprising:

an opening at the forward end of the probe communicating with the suction selectively applied to the probe, for admitting fecal matter and liquid into the probe;

guide means extending forwardly beyond the opening in interrupted relation around the opening and converging to form a tip which guides the probe for entering the vent; and The liquid applying means imparts the lateral flow of liquid outwardly at the interruption in the guide means to entrain fecal matter in the vent.

7. Apparatus as in claim 6, wherein:

the liquid applying means comprises a conduit extending beyond the opening at the forward end of the probe and having at least one liquid discharge opening for imparting the lateral flow of liquid outwardly through the interruption in the guide means.

8. Apparatus for cleaning the vent of fowl and for use in conjunction with an overhead conveyor for moving suspended fowl carcasses comprising:

a carousel support apparatus including a vertical rotatable shaft and a toothed wheel carried by the shaft for engagement by the overhead conveyor, whereby the shaft simultaneously rotates with movement of the conveyor;

a plurality of elongated members mounted in symmetrical relation around the shaft for rotation with the shaft, each elongated member having a forward end operative for insertion into the vent of a fowl;

fowl support means associated with each elongated member to engage a suspended fowl arriving on the conveyor and support that fowl with the vent in predetermined relation to the corresponding elongated member as the shaft rotates;

each elongated member including first and second fluid flow passages having openings communicating with the forward end;

The first passage selectively connected to a source of suction tending to draw fecal matter from the vent into the opening of the one passage;

the second passage selectively connected to introduce a flow of liquid within the vent so as to entrain the fecal matter for withdrawal through the first passage;

vertical positioning means associated with each elongated member to move the corresponding vertical member along a predetermined vertical path to enter the vent of a fowl supported in relation to the elongated member, and to withdraw the elongated member after the shaft has rotated a predetermined extent; and valve means associated with the passages of each elongated member and operative in response to the rotary position of the shaft to initially apply suction to the first passage of each elongated member after that elongated member moves to enter the vent, to maintain the suction applied to the first passage while subsequently applying a liquid flow to the second passage for a time, and then to shut off that water flow and thereafter to remove the suction from each elongated member, so that liquid from the second passage enters the vent only while suction from the first passage is applied to the vent, thereby preventing injection of the liquid into the fowl beyond the forward end;

whereby fecal matter is withdrawn seriatim from the vent of each fowl moving along the conveyor.

* * * * *